(12) United States Patent
Deixler et al.

(10) Patent No.: US 10,360,016 B2
(45) Date of Patent: Jul. 23, 2019

(54) UPGRADING A LIGHT SOURCE (71) Applicant: SIGNIFY HOLDING B.V., Eindhoven (NL)

(72) Inventors: Peter Deixler, Valkenswaard (NL); Jean-Paul Jacobs, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/570,569

(22) PCT Filed: Apr. 21, 2016

(86) PCT No.: PCT/EP2016/058892
§ 371 (c)(1),
(2) Date: Oct. 30, 2017

(87) PCT Pub. No.: WO2016/173921
PCT Pub. Date: Nov. 3, 2016

(65) Prior Publication Data
US 2018/0129493 A1  May 10, 2018

(30) Foreign Application Priority Data
Apr. 30, 2015 (EP) ..................... 15165857

(51) Int. Cl.
*G06F 8/65* (2018.01)
*H04W 4/80* (2018.01)
(Continued)

(52) U.S. Cl.
CPC ............ *G06F 8/65* (2013.01); *H04L 12/2814* (2013.01); *H04L 12/2816* (2013.01);
(Continued)

(58) Field of Classification Search
CPC ... G06F 8/65; H04L 12/2814; H04L 12/2816; H04L 2012/2841; H04W 4/80;
(Continued)

(56) References Cited

U.S. PATENT DOCUMENTS

2003/0189429 A1* 10/2003 Belenger ............... G01R 31/44
324/414
2005/0131810 A1* 6/2005 Garrett ................. G06Q 20/10
705/39
(Continued)

FOREIGN PATENT DOCUMENTS

WO  2006107647 A1  10/2006
WO  2012090116 A1  7/2012
(Continued)

*Primary Examiner* — Qing Chen
(74) *Attorney, Agent, or Firm* — Meenakshy Chakravorty (57) ABSTRACT

A method comprising: providing a light source in the form of a luminaire or lamp operable to emit light into an environment, the light source being activated from a time at which the light source is first deployed into said environment to enable the light to be controlled via a first communication channel, but having a capability for the light to be controlled via a second communication channel being electronically deactivated at the time of deployment; then after the time of deployment of the light source into the environment, receiving a request to upgrade the light source; and in response to this request, sending activation data to the light source or a user of the light source, thereby enabling the capability for the light to be controlled via the second communication channel to be electronically activated.

15 Claims, 2 Drawing Sheets

(51) Int. Cl.
*H04L 12/28* (2006.01)
*H05B 37/02* (2006.01)

(52) U.S. Cl.
CPC ..... *H05B 37/0245* (2013.01); *H05B 37/0254* (2013.01); *H05B 37/0272* (2013.01); *H05B 37/0281* (2013.01); *H04L 2012/2841* (2013.01); *H04W 4/80* (2018.02); *Y02B 20/42* (2013.01)

(58) Field of Classification Search
CPC ............ H05B 37/0245; H05B 37/0254; H05B 37/0272; H05B 37/0281; Y02B 20/42
USPC .................................................. 717/168–173
See application file for complete search history.

(56) References Cited

U.S. PATENT DOCUMENTS

| | | | |
|---|---|---|---|
| 2007/0081335 A1* | 4/2007 | Kim | H05B 37/0218 362/276 |
| 2008/0172300 A1* | 7/2008 | Karki | G06Q 30/06 705/26.8 |
| 2011/0137757 A1 | 6/2011 | Paolini et al. | |
| 2012/0031287 A1 | 2/2012 | Ingraselino et al. | |
| 2012/0317418 A1* | 12/2012 | Brundridge | H04L 9/3247 713/176 |
| 2013/0132267 A1* | 5/2013 | Moore | G06Q 20/10 705/38 |
| 2013/0221858 A1* | 8/2013 | Silberstein | H05B 37/0272 315/153 |
| 2013/0293112 A1* | 11/2013 | Reed | H05B 33/0863 315/131 |
| 2014/0265919 A1 | 9/2014 | Pope et al. | |
| 2014/0285113 A1* | 9/2014 | Huang | H05B 37/0272 315/297 |
| 2014/0373000 A1* | 12/2014 | Kanematsu | G06F 8/65 717/170 |
| 2015/0006695 A1* | 1/2015 | Gupta | H04L 41/32 709/223 |
| 2016/0195859 A1* | 7/2016 | Britt | G05B 15/02 700/275 |

FOREIGN PATENT DOCUMENTS

| | | |
|---|---|---|
| WO | 2014162279 A1 | 10/2014 |
| WO | 2015049412 A1 | 4/2015 |

* cited by examiner

UPGRADING A LIGHT SOURCE

CROSS-REFERENCE TO PRIOR APPLICATIONS

This application is the U.S. National Phase application under 35 U.S.C. § 371 of International Application No. PCT/EP2016/058892, filed on Apr. 21, 2016, which claims the benefit of European Patent Application No. 15165857.2, filed on Apr. 30, 2015. These applications are hereby incorporated by reference herein.

TECHNICAL FIELD

The present disclosure relates to providing a luminaire or individual lamp with the additional functionality of being able to be controlled remotely from a control device such as a smartphone, tablet or laptop or desktop computer.

BACKGROUND

A luminaire (light fixture) is a device comprising at least one lighting element (lamp) for emitting the illumination, and any associated socket, support and/or housing. A luminaire may take any of a variety of forms, such as a conventional ceiling or wall mounted luminaire, a free standing luminaire or a wall washer, or a less conventional form such as an illumination source built into a surface or an item of furniture, or any other type of lighting device for emitting illumination into an environment. The lamp refers to the actual lighting element, of which there may be one or more per luminaire. The lamp may also take any of a number of forms, such as an LED-based lamp comprising one or more LEDs, a organic LED (OLED) or a gas-discharge lamp, or a traditional filament bulb. "Light source" is a general term which may be used herein to refer to either an individual lamp or a luminaire comprising one or more lamps.

Nowadays a luminaire or even an individual lamp may also be equipped with a communication interface allowing the luminaire or lamp (light source) to be controlled remotely by lighting control commands received from a user device such as a smartphone, tablet, laptop or desktop computer, or wireless wall-switch; and/or based on sensor readings received from one or more remote sensors. The communication interface may be included in the housing of the luminaire, or even directly within the lamp itself (e.g. in the end-cap of a retrofittable replacement for a filament bulb or fluorescent tube). For example this can allow a user, through the user device, to turn the illumination from the light source (luminaire or lamp) on and off, to dim the illumination level up or down, to change the colour of the emitted illumination, and/or to create a dynamic (time varying) lighting effect. In addition, a light source may include one or more of various types of environmental sensor built in to the light source, e.g. for aggregating data from multiple such light sources, both related to lighting (e.g. daylight or occupancy sensor) and/or non-lighting applications (CO, $CO_2$, moisture, noise, temperature, pollution)

In one form, the communication interface is configured to receive the lighting control commands and/or to share sensor data via a local wireless communication channel, typically using a short-range radio access technology such as Wi-Fi, ZigBee or Bluetooth or contact-less communication technologies such as NFC. This could be either via a direct link from the control device to the light source (e.g. a direct wireless link such as a ZigBee or Bluetooth link), or via a router of a local area network (e.g. via a wireless router of a wireless area network such as a Wi-Fi network), or even via a local ad hoc connection amongst a distributed network of light sources (e.g. again using ZigBee or Bluetooth). In the case of radio, short range communication technology may be on an unlicensed band. In the case of wireless communications generally, a local communication technology typically operates over a range less than 100 to 200 m, or less. Such luminaires or lamps as described above may be referred to herein as "wireless light sources".

In another form, the communications interface of the light source is configured to allow it to receive the lighting control commands and/or to share sensor data via a connection over a wide area network, such as the Internet a mobile cellular network (e.g. a 3GPP network), and/or even a dedicated wide-area lighting control network (e.g. based on long-range RF) or a smart city-infrastructure network (such as a mesh network for smart meters, lighting and smart city applications). This may be conducted using a suitable packet-based communication technology for wide area communications over wired and/or wireless networks, such as Internet Protocol (IP), cellular protocols, or even dedicated wide area lighting control technologies such as those based on Ultra Narrow Band. A wide area network is one that covers a greater area than a local area network or other such short range, local technology, and often much greater distances (e.g. networked end nodes separated by >1000 m). Such light sources as these may be referred to herein as "connected" light sources (though note that the fact that "connected light sources" are contrasted herein with basic "wireless light sources" does not exclude the possibility that connected light sources may use wireless means, e.g. the connection between the light source and a bridge providing access to the wide area network may be via a local wireless link, such as via Wi-Fi, 6LoWPAN, ZigBee or Bluetooth).

There is an increasing number of wireless light sources being deployed capable of communicating with a wireless control device such as a user terminal or sensor in a limited-size local network. Connected light sources, with additional advanced digital functionality including remote connection, are also of interest to some users but are more complex for the provider to implement. Two options are presently used by providers. The first option is to offer two intentionally non-interoperable wireless ecosystems. The second option is to use the same wireless light source SKU (stock-keeping-unit, i.e. product) for both the wireless light source and the connected light source.

SUMMARY

The first of the above options has the disadvantage that the system is inflexible, in that a user of one or more basic wireless light sources would have to install a whole new system in order to take migrate to more advanced connected features. On the other hand, the second option has the disadvantage that the provider has to provide light sources equipped with the capacity for the more advanced connected functionality indiscriminately to all users.

It would be desirable to provide a model for upgrading a light source (luminaire and/or individual lamp) from one communication technology to another, such as from stand-alone local control to bridge-based connected lighting.

According to one aspect disclosed herein, there is provided a method comprising: providing a light source in the form of a luminaire or lamp operable to emit light into an environment (such as illumination for illuminating the environment), the light source being activated from a time at which the light source is first deployed into said environment to enable the light to be controlled via a first communication channel, but having a capability for the light to be controlled via a second communication channel being electronically deactivated at said time; then after said time of the deployment of the light source into said environment, receiving a request to upgrade the light source; and in response to said request, sending activation data to the light source or a user of the light source, thereby enabling said capability for the light to be controlled via the second communication channel to be electronically activated.

For instance, the light source may be equipped with said capability for the light to be controlled via the second communication channel from the time of said deployment of the light source, but with said capability being electronically deactivated by being electronically locked at said time of deployment; and said activation data may comprise an electronic security key, enabling said capability to be unlocked on said light source. Alternatively (or additionally) said capability may be electronically deactivated by at least part of the software required to implement said capability being omitted from the light source at said time of deployment, and the activation data may comprise a software upgrade which provides the omitted software (the software upgrade comprising code which when downloaded to and run on the light source provides said capability).

In embodiments, the first communication channel may be via a local area network, or a direct point-to-point connection with the light source. In embodiments, the first communication technology may comprise a wireless communication technology, such as ZigBee, Bluetooth, 6LoWPAN or Wi-Fi. Alternatively the first communication channel may be via a wired means such as power-line communication, Ethernet cables, DMX network or DALI network, or other cable-based network.

In embodiments, the second communication channel may be via a wide area network, such as the Internet, a cellular network such as a 3GPP network, or a dedicated wide-area (e.g. city-wide) lighting or utility control network (e.g. a smart city infrastructure network such as a wireless smart meter network). Alternatively the second communication channel may be just be via a local demand response controller for the entire building in which the light source is deployed.

In embodiments, the method may comprise receiving information relating to the light source, and computing a payment or other transaction as a function of said information; wherein the sending of said activation data may be made conditional on receipt of said payment or other transaction (where a payment means a monetary payment, and where other kinds of transactions could include for instance the customer making business commitments to order additional products from a supplier of the light source in the future, or to subscribe to service contracts, or advanced financing schemes). For example said information may comprise one or more of: a spent or remaining lifetime of the light source, a predicted power saving to be achieved by the upgrade, a predicted amount of time or number of times the second communication channel will be used to control the illumination, a type of the lighting bridge, a geographic location of said deployment, and/or a number of other networkable luminaires and/or utilities in said environment which could be incorporated into a same network as said light source if said capability is activated.

Thus there is enabled a dynamic-fee based upgrade system, whereby pricing of the fee based upgrade is dynamically calculated on case-per-case basis, based on the specific user benefit obtained from upgrading from a connect ready to a connected systems.

In embodiments, said security key may be (at least in part) based on a unique ID of the light source. In embodiments the security key may be based on both the unique ID of the light source and a universal unlocking key common to multiple light sources.

In embodiments, a security key may also be required for unlocking the first communication technology to enable the light to be controlled via the first communication technology, but the security key for unlocking the first communication technology may be provided to the light source or user prior to said deployment or at the time of said deployment.

In embodiments, said request is received from a user. In embodiments, the method may further comprise: detecting the deployment of the light source in said environment, when having said second communication technology locked; and in response to said detection, prompting a user with an option to upgrade the light source, thereby invoking said request. Preferably (but not necessarily) the detecting of the deployment and/or the prompting of the user are performed automatically.

According to another aspect disclosed herein, there is provided a system comprising a light source in the form of a luminaire or lamp deployed in an environment, arranged to emit light into the environment, wherein the light source is configured to enable the light to be controlled via a first communication channel, but having a capability for the light to be controlled via a second communication channel being electronically deactivated; and a server arranged to receive a request to upgrade the light source, and in response to said request, to send activation data to the light source or a user of the lights source, thereby enabling said capability for the light to be controlled via the second communication channel to be electronically activated.

In embodiments, the system comprises a lighting bridge arranged to automatically detect the deployment of the light source in said environment when having said second communication technology locked, and in response to said detection, to automatically prompt a user with an option to upgrade the light source, thereby invoking said request.

According to another aspect disclosed herein, there is provided a computer program product for controlling a light source in the form of a luminaire or lamp to emit light into an environment, the computer program product being embodied on a computer-readable storage medium and configured so as when run on the light source to: from a time at which the light source is first deployed into said environment, enabling the light to be controlled via a first communication channel; receive activation data after said time of deployment of the light source into said environment; and use the received activation data to enable the light to be controlled via a second communication channel.

In the context of this disclosure and the claims, the meaning of the wording "activated to enable" is similar to that of "adapted to" or "configured to" but with an additional focus on the activation aspect of the feature being enabled. In further embodiments, the light source, computer program, server or bridge, as appropriate, may be configured to perform any of the method steps disclosed herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

The following describes an in-field migration path for end users to upgrade their wireless luminaires or lamps for usage within a more connected system.

In this disclosure the terms local area network, direct point-to-point connection, ZigBee, ZigBee Light Link, Bluetooth, 6LoWPAN, Wi-Fi, power-line communication, Ethernet, DMX, DALI, wide area network, Internet, and cellular network are explained as follows:

"Local area network" (LAN) is a network that interconnects computing devices within a limited area such as a residence, school, laboratory, or office building. A local area network is contrasted in principle to a wide area network (WAN), which covers a larger geographic distance and may involve leased telecommunication circuits, while the media for LANs are locally managed. Ethernet over twisted pair cabling and Wi-Fi are the two most common transmission technologies in use for local area networks.

A "direct point-to-point connection" is a network topology for arranging elements/nodes in a network. Point-to-point connections are the simplest topology with a dedicated link between two endpoints. Switched point-to-point topologies are the basic model of conventional telephony. A permanent point-to-point network has the advantage of unimpeded communications between the two endpoints.

"ZigBee" is an IEEE 802.15.4-based specification for a suite of high-level communication protocols used to create personal area networks with small, low-power digital radios. The technology defined by the ZigBee specification is intended to be simpler and less expensive than other wireless personal area networks (WPANs), such as Bluetooth or Wi-Fi. Applications include wireless light switches, electrical meters with in-home-displays, traffic management systems, and other consumer and industrial equipment that requires short-range low-rate wireless data transfer.

Its low power consumption limits transmission distances to 10-100 meters line-of-sight, depending on power output and environmental characteristics. ZigBee devices can transmit data over long distances by passing data through a mesh network of intermediate devices to reach more distant ones. ZigBee is typically used in low data rate applications that require long battery life and secure networking (ZigBee networks are secured by 128 bit symmetric encryption keys.) ZigBee has a defined rate of 250 kbit/s, best suited for intermittent data transmissions from a sensor or input device. ZigBee was conceived in 1998, standardized in 2003, and revised in 2006.

The ZigBee Alliance is a group of companies that maintain and publish the ZigBee standard.[10] The term ZigBee is a registered trademark of this group, not a single technical standard. The Alliance publishes application profiles that allow multiple OEM vendors to create interoperable products. The relationship between IEEE 802.15.4 and ZigBee[11] is similar to that between IEEE 802.11 and the Wi-Fi Alliance. The current list of published application profiles includes: ZigBee Home Automation 1.2, ZigBee Smart Energies 1.1b, ZigBee Telecommunication Services 1.0, ZigBee Health Care 1.0, ZigBee RF4CE—Remote Control 1.0, ZigBee RF4CE—Input Device 1.0, ZigBee Remote Control 2.0, ZigBee Light Link 1.0, ZigBee IP 1.0, ZigBee Building Automation 1.0, ZigBee Gateway 1.0, ZigBee Green Power 1.0 (Optional battery-less remote control feature of ZigBee 2012) and ZigBee Retail Services.

"ZigBee Light Link" gives the lighting industry a global standard for interoperable and very easy-to-use consumer lighting and control products. It allows consumers to gain wireless control over all their LED fixtures, light bulbs, timers, remotes and switches. Products using this standard will let consumers change lighting remotely to reflect ambiance, task or season, all while managing energy use and making their homes greener. Since ZigBee Light Link is a ZigBee standard, lighting products will interoperate effortlessly with products using other ZigBee standards already in consumers' homes, including ZigBee Home Automation, ZigBee Input Device, ZigBee Remote Control and ZigBee Health Care.

"Bluetooth" is a wireless technology standard for exchanging data over short distances (using short-wavelength UHF radio waves in the ISM band from 2.4 to 2.485 GHz) from fixed and mobile devices, and building personal area networks (PANs). Bluetooth is managed by the Bluetooth Special Interest Group (SIG), which has more than 25,000 member companies in the areas of telecommunication, computing, networking, and consumer electronics. The IEEE standardized Bluetooth as IEEE 802.15.1, but no longer maintains the standard. The Bluetooth SIG oversees development of the specification, manages the qualification program, and protects the trademarks. A manufacturer must make a device meet Bluetooth SIG standards to market it as a Bluetooth device.

"6LoWPAN" is an acronym of IPv6 over Low power Wireless Personal Area Networks. 6LoWPAN is the name of a concluded working group in the Internet area of the IETF (Internet Engineering Task Force). The 6LoWPAN concept originated from the idea that "the Internet Protocol could and should be applied even to the smallest devices," and that low-power devices with limited processing capabilities should be able to participate in the Internet of Things. The 6LoWPAN group has defined encapsulation and header compression mechanisms that allow IPv6 packets to be sent and received over IEEE 802.15.4 based networks. The base specification developed by the 6LoWPAN IETF group is RFC 4944 (updated by RFC 6282 with header compression, and by RFC 6775 with neighbor discovery optimizations).

"Wi-Fi" is a technology that allows electronic devices to connect to a wireless LAN (WLAN) network, mainly using the 2.4 gigahertz UHF and 5 gigahertz SHF ISM radio bands. The Wi-Fi Alliance defines Wi-Fi as any "wireless local area network" (WLAN) product based on the Institute of Electrical and Electronics Engineers' (IEEE) 802.11 standards.

"Power-line communication" (PLC) is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). A wide range of power-line communication technologies are needed for different applications, ranging from home automation to Internet access which is often called broadband over power lines (BPL). Most PLC technologies limit themselves to one type of wire (such as premises wiring within a single building), but some can cross between two levels (for example, both the distribution network and premises wiring). Typically transformers prevent propagating the signal, which requires multiple technologies to form very large networks. Various data rates and frequencies are used in different situations.

"Ethernet" is a family of computer networking technologies commonly used in local area networks (LANs) and metropolitan area networks (MANs). It was commercially introduced in 1980 and first standardized in 1983 as IEEE 802.3, and has since been refined to support higher bit rates and longer link distances. The original 10BASE5 Ethernet uses coaxial cable as a shared medium, while the newer Ethernet variants use twisted pair and fiber optic links in conjunction with hubs or switches. Over the course of its history, Ethernet data transfer rates have been increased from the original 2.94 megabits per second (Mbit/s) to the latest 100 gigabits per second (Gbit/s), with 400 Gbit/s expected by late 2017. The Ethernet standards comprise several wiring and signaling variants of the OSI physical layer in use with Ethernet.

"DMX" (Digital Multiplex) or DMX512 is a standard for digital communication networks that are commonly used to control stage lighting and effects. DMX was originally intended as a standardized method for controlling light dimmers, which, prior to DMX512, had employed various incompatible proprietary protocols. It soon became the primary method for linking controllers (such as a lighting console) to dimmers and special effects devices such as fog machines and intelligent lights. DMX has also expanded to uses in non-theatrical interior and architectural lighting, at scales ranging from strings of Christmas lights to electronic billboards. DMX can now be used to control almost anything, reflecting its popularity in theaters and venues. DMX512 employs EIA-485 differential signaling at its physical layer, in conjunction with a variable-size, packet-based communication protocol. It is unidirectional.

"DALI" (Digital Addressable Lighting Interface) is a data protocol and transport mechanism that was jointly developed and specified by several manufacturers of lighting equipment. The common platform of DALI enables equipment from different manufacturers to be connected together. The first version of the DALI standard was defined in appendix E of the IEC 60929. The DALI protocol is now set out in IEC 62386. IEC 60929 and IEC 62386 are technical standards for network-based systems that control lighting in building automation. They were established as a successor for 0-10 V lighting control systems, and as an open standard alternative to Digital Signal Interface (DSI), on which it is based.

A "wide area network" (WAN) is a telecommunications network or computer network that extends over a large geographical distance. Wide area networks are often established with leased telecommunication circuits. The Internet may be considered a WAN. Many technologies are available for wide area network links. Examples include circuit switched telephone lines, radio wave transmission, and optic fiber. New developments in technologies have successively increased transmission rates. Presently households are connected to the Internet with ADSL, Cable, Wimax, 4G or fiber at speeds ranging from 1 Mbit/s to 1 Gbit/s and the connections in the core of a WAN can range from 1 Gbit/s to 100 Gbit/s.

"Internet" is the global system of interconnected computer networks that use the Internet protocol suite (TCP/IP) to link billions of devices worldwide. It is a network of networks that consists of millions of private, public, academic, business, and government networks of local to global scope, linked by a broad array of electronic, wireless, and optical networking technologies. The Internet carries an extensive range of information resources and services, such as the inter-linked hypertext documents and applications of the World Wide Web (WWW), electronic mail, telephony, and peer-to-peer networks for file sharing.

While the hardware components in the Internet infrastructure can often be used to support other software systems, it is the design and the standardization process of the software that characterizes the Internet and provides the foundation for its scalability and success. The responsibility for the architectural design of the Internet software systems has been assumed by the Internet Engineering Task Force (IETF). The IETF conducts standard-setting work groups, open to any individual, about the various aspects of Internet architecture. Resulting contributions and standards are published as Request for Comments (RFC) documents on the IETF web site. The principal methods of networking that enable the Internet are contained in specially designated RFCs that constitute the Internet Standards. Other less rigorous documents are simply informative, experimental, or historical, or document the best current practices (BCP) when implementing Internet technologies. The Internet standards describe a framework known as the Internet protocol suite.

A "cellular network" or mobile network is a communication network where the last link is wireless. The network is distributed over land areas called cells, each served by at least one fixed-location transceiver, known as a cell site or base station. This base station provides the cell with the network coverage which can be used for transmission of voice, data and others. In a cellular network, each cell uses a different set of frequencies from neighboring cells, to avoid interference and provide guaranteed bandwidth within each cell. When joined together these cells provide radio coverage over a wide geographic area. This enables a large number of portable transceivers (e.g., mobile phones, pagers, etc.) to communicate with each other and with fixed transceivers and telephones anywhere in the network, via base stations, even if some of the transceivers are moving through more than one cell during transmission.

A simple view of the cellular mobile-radio network consists of the following: (i) a network of radio base stations forming the base station subsystem, (ii) the core circuit switched network for handling voice calls and text, (iii) a packet switched network for handling mobile data, and (iv) the public switched telephone network to connect subscribers to the wider telephony network.

The above communication methods may be grouped in different categories depending of the specific feature(s) of the communication method taken into account. One classification may for example be based on wired (e.g. DALI, DMX, power-line communication, Ethernet) versus wireless (e.g. Wi-Fi, ZigBee, Bleutooth, 6LoWPAN). Communication methods frequently applied for indoor lighting applications include for example ZigBee Light Link, DMX and DALI whereas for outdoor lighting applications power-line communication and cellular networks are for example used. Recently, with the realm of the Internet of Thinks, the lighting industry is also adopting Internet Protocol (IP), power-over-ethernet (PoE) and USB standards to connect to and communicate with lighting devices in a network.

For example, in embodiments each light source Stock Keeping Unit (SKU) will be provided with a proprietary Connect-Ready key and a Zigbee Light Link key. Connect-ready herein refers to a system which is not connected to the internet (but has the potential to be). Connect-Ready and Zigbee Light Link are designed as two different parallel universes following a similar security & key approach, and the same command set as Zigbee Light Link, but the Connect-Ready keys are only known or only available to certain luminaires. When the light source is sold as a (basic) wireless light source, the Zigbee Light Link key is not enabled.

The migration method includes the following features.

The bridge of a connected system may discover a non-connected wireless light source and may for example suggest the end user for a fee-based upgrade.

If the end user confirms a desire to upgrade, the bridge requests application related data from the wireless light source's application framework.

Based on the received data, the bridge or portal calculates a dynamic fee or recurring revenue for the upgrade from a standalone wireless light source to a connected light source. The fee or recurring revenue is related to the data received by the bridge.

Upon payment by the end user, the bridge sends a proof of payment or other authentication or access-control-credentials to the wireless light source, which then changes its status to allow connectivity to a network controlled by the bridge. The wireless light source changes its proprietary Connect-Ready key into an official ZigBee Light Link key for the connected system.

The fee may be based on the potential revenues associated with the usage data received by the bridge from the light source. The fee may also be based on the desired future usage characteristics by the bridge for the light source (e.g. desired future control features for the light source, desired access of light source data for data analytics such as end-of-life data, geographical location and/or size of the connected network, etc.).

In addition to unlocking the wireless light source for upgrade to a connected light source, a similar fee-based unlocking mechanism can be used to selectively allow a firmware upgrade over the air or any updates of configuration data (for instance to upgrade the behaviour of light sources with the latest sensing recipe).

Certain components within the ecosystem, such as wireless wall switches may be automatically upgraded—without a fee payment—towards a connected switch, while other components such as LED light sources require a fee.

The disclosed techniques can also be extended for example to Wi-Fi, 6LoWPAN or Bluetooth use cases where just a smartphone and the LED light source are involved without the presence of a bridge. The disclosed techniques enable one to use the same luminaire SKU for both the "wireless (connect ready)" and the "connected" cases. The disclosed model enables one to keep the "wireless" and "connected" control ecosystems non-interoperable, while at the same time nevertheless enabling a dynamic-fee based in-field migration path for end-users to upgrade their "wireless" light sources for usage within a "connected" system.

Figure 1:
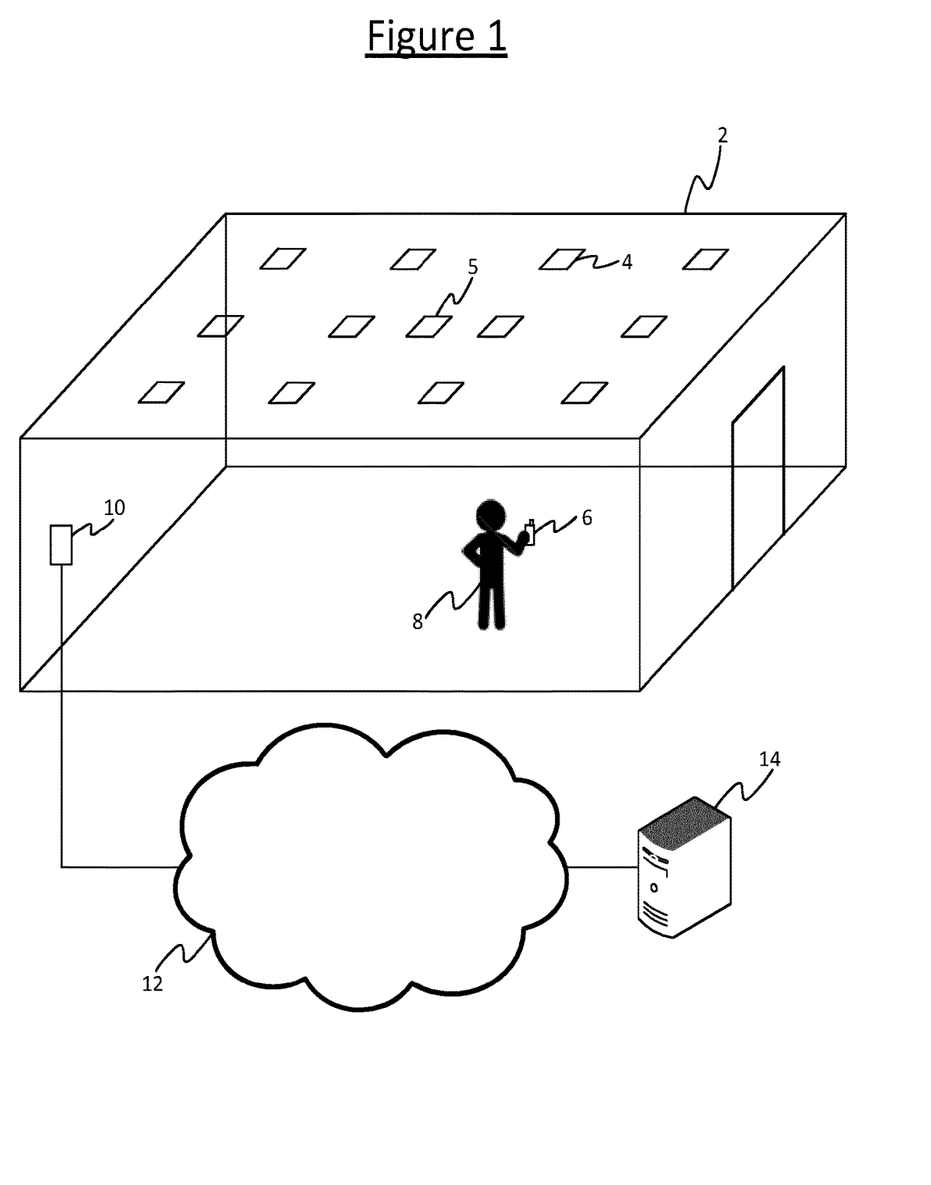
FIG. 1 is a schematic illustration of a lighting system.

FIG. 1 illustrates an example lighting system in which the disclosed techniques may be implemented. The system comprises one or more luminaires 4 installed in an environment 2, arranged to emit light in order to illuminate that environment 2. The environment 2 may be an indoor space such as one or more rooms and/or corridors; or an outdoor space such as a park, garden, road, or outdoor parking area; or a partially covered space such as a stadium, structured parking facility or gazebo; or any other space such as an interior of a vehicle, or any combination of these. Each of the luminaires 4 comprises at least one respective lamp such as an LED-based lamp, gas-discharge lamp or filament bulb, plus any associated housing or support. Each of the luminaires 4 may take any suitable form such as a ceiling or wall mounted luminaire, a free standing luminaire, a wall washer, or a less conventional form such as or embedded lighting built into an item of furniture, a building material such as glass or concrete, or any other surface. In general a luminaire 4 may be any type of illumination device for emitting illumination into the environment 2 so as to illuminate the environment 2—i.e. devices designed and used to allow users to see and find their way about within the environment 2, providing or substantially contributing to the illumination on a scale adequate for that purpose.

To control the lighting system, one or more user terminals 6 may be operated by one or more users 8. For example the user terminal 6 may take the form of a mobile user terminal such as a smartphone, tablet or laptop; or alternatively could be a non-mobile terminal such as a desktop computer or a wireless wall-switch. The user terminal 6 is configured to be able to control the illumination emitted by one or more of the luminaires 4 in the lighting system by transmitting control signals to the one or more luminaires 4, e.g. to turn the emitted illumination on or off, dim the illumination level, control the colour of the illumination, and/or cause a dynamic (time-varying) effect in the illumination.

Alternatively or additionally, one or more of the luminaires 4 may be controlled based on a signal from one or more sensors 5, indicative of a sensor reading or sensor readings taken by the sensor(s) 5. E.g. the sensor(s) 5 may comprise one or more presence sensors for sensing the presence of a person in the environment 2, in which case the sensor signals are indicative of the sensed presence (or lack thereof), and the luminaire(s) 4 may be configured to dim up or turn on the emitted illumination when a person is detected to be present in a certain predefined vicinity, and conversely dim down or turn off the emitted illumination when no person is detected to be present in the predetermined vicinity. And/or, the sensor(s) 5 may comprise one or more light sensors for sensing an amount of ambient light in the environment 2, in which case the sensor signals are indicative of the sensed amount of light, and the luminaire(s) 4 may be configured to dim up or turn on the emitted illumination when less ambient light is detected and to turn off or dim down the emitted illumination when more ambient light is detected.

Thus either a user device 6 and/or a sensor device 5 may act as control device for controlling the one or more luminaires 4, by transmitting one or more control signals in the form of command signals and/or sensor signals to the one or more luminaires 4. The rule engine for deciding the lighting setting of the luminaire (based on the one or more stimuli from the one or more sensors, switches, timers and/or UIs) may be located within the luminaire 4 or may reside in a device outside of the luminaire (e.g. sensor 5). In embodiments, the user device 6 may also receive information back from one or more of the luminaires 4, e.g. status information such as operating temperature, burning hours to date, a report of a detected fault condition, collected environmental data from luminaire-based sensors, etc.

To achieve any of the above the communications from and/or to a user device 6 and/or sensor 5, one or more of the luminaires 4 may each be equipped with two different possible communication mechanisms for receiving the control signals: in embodiments, a first, basic "wireless" ("connect ready") communication mechanism; and a second, more advanced "connected" communication mechanism. Note: alternatively each individual lamp may be equipped with the control mechanisms discussed below (e.g. with a transceiver and logic being embedded in the endcap of a retrofittable LED-based replacement for a traditional filament bulb or fluorescent tube). For the purpose of illustration, the following will be described in terms of a luminaire with the relevant communication mechanisms being included in the luminaire's housing, and with the device to be upgraded being the luminaire 4 as a whole. However, it will be appreciated that in other embodiments, any of the teachings below and elsewhere herein could apply equally to upgrading an individual wireless lamp (with one or more lamps being present per luminaire 4).

In embodiments, the first, basic wireless communication mechanism uses a local wireless technology, e.g. a short-range RF technology such as Wi-Fi, ZigBee, 6LoWPAN or Bluetooth. This may enable the control device(s) 6 and/or sensor(s) 5 to communicate directly with each individual one of the one or more luminaires 4 being controlled, i.e. via a direct point-to-point connection. Alternatively the first communication mechanism may involve a control device 6 and/or sensor(s) 5 communicating with the luminaire(s) 4 via a wireless local area network (LAN), e.g. via a "dumb" wireless router such as a home or office Wi-Fi router (not shown).

The second, "connected" communication mechanism on the other hand involves a lighting bridge 10 installed or otherwise disposed in the environment 2, e.g. in the form of a wall-panel, a unit hidden above the ceiling, or a free-standing unit. To use this, the user device 6 and/or sensor 5 connects to the bridge 10, and in turn the bridge 10 connects to the one or more luminaires 4 being controlled. The communications between the user device 6 and/or sensor(s) 5 are then conducted via the bridge 10. The bridge 10 may either (A) enable more advanced features than offered in the connect ready situation, (B) enable connection to the internet 12, and/or (C) enables personal UI devices 6 to control the lighting (which was previously not necessarily possible in the "connect-ready" situation, e.g. the first communication channel only enabling control from a wall-switch).

For example, the bridge 10 may be involved in some of the processing of the content of the control signals from/to the user device 6 and/or sensor(s) 5, e.g. to receive the sensor signals from one or more sensors 5 and perform the decision-making process to control the dimming of the one or more luminaires 4 based on these signals; or to interpret or apply one or more conditions to the user's control commands, such as to arbitrate between commands from different users, etc.; or to collect status reports from multiple luminaires 4 and interpret these to determine whether and/or what to report to the user device 6 based on these. Alternatively the bridge 10 may simply forward one or more such communications to/from the luminaire 4 from/to the user device 6 and/or sensor 5 unconditionally, without any substantive processing of the content.

As another example, the bridge 10 may act as an access point or gateway to a wide area network such as the Internet 12. When the user device 6 or sensor 5 connects to the bridge 10, it may use the bridge to connect to a server 12 comprising one or more server units at one or more sites. This server 12 may be described herein as the "portal". The portal may for instance be the meethue.com portal of the Philips hue system. For example, the server 12 may be arranged to authenticate the user 8 or user device 6 (e.g. based on a password and username), and/or may be arrange to allow the user device 6 and/or sensor(s) 5 to retrieve one or more settings relating to the control of the one or more luminaires 4, e.g. one or more dynamic lighting effects, and/or sensor recipes (algorithms for determining how the control of the one or more luminaires 4 varies in dependence one the one or more sensor readings). For instance the user could have such settings stored as part of an account hosted by the portal 14, which the user can access when he or she logs in with his or her username and password.

Alternatively or additionally, the bridge 10 may be arranged to allow the user 8 to control one or more of the luminaires 4 in said environment 2 from his or her user device 6 when located outside of the environment, by transmitting the command signals from the user device 6 to the one or more luminaires 4 via the internet 12 and bridge 10 (and optionally also via the portal server 14). Thus the user 8 is able to control the lighting even when remote from the environment 2 in question.

The bridge 10 also may be used for data aggregation, e.g. by reporting data about the status and/or usage of the luminaire 4 via the internet 12 for "big data" purposes.

The various control functionalities of the user device 6, sensor 5 and/or luminaire 4 as disclosed anywhere herein may be implemented in software code stored on a memory (comprising one or more storage devices) of the relevant entity 4, 5, 6 and arranged so as when run on a processor (comprising one or more processing units) of the relevant entity 4, 5, 6 to perform operations in accordance with the techniques disclosed herein. Alternatively it is not excluded to use an implementation in dedicated hardware circuitry, or configurable or reconfigurable circuitry such as a PGA or FPGA, or any combination of software and hardware. The communication functionality will require at least some front-end hardware, but the associated communication protocols may be implemented in software or hardware, or a combination thereof.

Note also that the disclosed techniques could be used in relation to any other combinations of first and second communication mechanism, e.g. a wired technology such as Ethernet, DMX or a power-line communication technology for the basic first communication mechanism; and/or a mobile cellular network such as a 3GPP network for the second, more advance mechanism. The following may be described in relation to the example of a local wireless technology such as ZigBee for the first, basic wireless technology, and communication via a bridge 10 and/or the Internet 12 as the second wireless technology, but it will be appreciated these examples are not necessarily limiting to all possible applications of the techniques disclosed herein.

As will be exemplified in more detail below, one or more of the luminaires 4 to be controlled are provided for deployment into said environment 2 equipped with the first, basic wireless functionality operational from a time at which the luminaire 4 is first deployed (e.g. if installation and commissioning are required, this means from the time it is first is installed and commissioned). The luminaire 4 is also equipped with the means (e.g. software) required to enable the second, "connected" functionality, but with this functionality electronically locked at the time at which the luminaire 4 is first deployed (e.g. even after it is first installed and commissioned).

In embodiments, the first and second technologies may comprise the same front-end hardware but may comprise different communication protocols—e.g. both employ Zig-Bee, but the first, basic wireless communication mechanism communicates directly with the one or more luminaires 4 being controlled; while the second, "connected" mechanism uses ZigBee to connect between the one or more luminaires 4 and the bridge 10, with the control being via bridge 10 and optionally internet 12 (or other wide area network). Alternatively, the first and second mechanisms may use different front-ends, e.g. the first uses Wi-Fi while the second uses a mobile cellular connection (e.g. based on of the 3GPP standards).

Either way, although the one or more luminaires 4 in question are provided equipped with both the first (basic wireless) and second ("connected") control technologies, in accordance with the present disclosure the first control technologies is initially locked and requires a security key to be unlocked for use to actually control the respective luminaire(s) 4. For example this security key may be supplied from the portal server 14 or bridge 10. The key could be transmitted directly to the relevant luminaire(s) 4; or it could be could sent to a user 8, e.g. on a dongle or as a code, and the user in turn uses this to unlock the new extra control functionality on the luminaire(s) 4.

The security key is provided to unlock the second technology any time substantially after the time at which the luminaire 4 is first deployed (e.g. after it is first installed and commissioned). For instance it could be send more than 1 day after, more than 1 week after, more than 1 month after or even more than 1 year after. In embodiments, this sending of the security key is performed in response to a request received from user to upgrade one or more of the luminaires 4, e.g. submitted through a user terminal. This could be the same user 8 and/or user device 6 as performs the actual control of the luminaire(s) 4. In the case where the key is returned to a user rather than directly to the luminaire 4, the user making the request could also be the same user 8 or a different user to whom the key is returned (e.g. a user could request the key him or herself; or could request the key on behalf of his friend, family member or colleague, etc.).

In further embodiments, the bridge 10 is configured to detect in said environment 2 a newly deployed (e.g. newly installed and commissioned) one of the luminaires 4 having both the first and second control technologies but with the second being locked. In this case, the bridge 10 may be configured to prompt a user to offer him or her the chance to request the upgrade. The prompt could be issued through the same user device 6 which the user will use to control the luminaire(s) 4, or a different device. For example, the bridge 10 may send a wireless signal such as a ZigBee or W-Fi signal to the user device 6, causing it to display the prompt on a screen of the user device 6. The user being prompted could be the same user 8 who is to control the luminaire(s) 4 in question, the same user who makes the request and/or the same user who the key is returned to, or could be a different user (e.g. the prompted user reminds his friend, family member or colleague to request a key at a later date).

As an example application of the disclosed techniques, the inventors believe that in the future, commodity wireless LED luminaires will play a central role for the future growth of the LED luminaire category. The expectation is that this wireless luminaires retail business will quickly become a relatively low margin "red-ocean" (i.e. "shark infested waters") similar to the conventional LED luminaire or Complact Fluorescent Lamps (CFL) business. On the other hand, the "connected" business will continue to be focused to build a high margin "blue-ocean" (i.e. "dolphins & sunshine") business centred on advanced digital functionality such as portals for remote access.

There is hence a desire to separate these "red ocean" of wireless LED luminaires (e.g. commodity products on the bottom of the shelf at a home-furnishings store, DIY store or supermarket) from the "blue ocean" of connected LED luminaires (e.g. at a high-tech electronics store), while still enabling a path for in-field upgradability from a "red ocean" LED lamp products towards a "blue-ocean" LED luminaire.

This present disclosure enables a wireless LED luminaire solution, which enables fee-based business models based upon field upgrading of mass-market wireless lamps (e.g. $14.95 sales price at the home-furnishings or DIY store; 25% integral gross margin) towards connected full-feature wireless luminaires (e.g. $19.95, 40% integral gross margin at the electronics store). This model will help to drive further penetration of lighting bridges 10 via customers who initially only purchased basic wireless "red ocean" luminaires.

To deal with the "red ocean" vs. "blue ocean" challenge (basic wireless vs. connected), two options are currently used by providers:

(I) two intentionally non-interoperable wireless ecosystems are used to separate blue and red-ocean products; or (II) many companies are now using the same wireless lamp SKU within both "red ocean" and "blue ocean" use cases. Hence, the "red-ocean" customers using their wireless LED luminaires only with wireless wall switches (without any bridge) must nevertheless indirectly pay for bridge related cost; the bridge software development efforts and recurring cloud service costs are typically covered via the hardware sales price of the LED luminaires. As a consequence, the pricing of the "red-ocean+blue-ocean" luminaire (equipped with the capacity for basic wireless and connected functionality) may be non-competitive compared competitors introducing a dedicated wireless ecosystem for "red-ocean" (basic wireless) only use cases.

The present disclosure describes a technical solution which enables the use of exactly same LED lamp SKU for both "blue-ocean" and the "red-ocean" markets; the model enables at the same time (I) to keep the "red-ocean" and "blue ocean" control ecosystems non-interoperable and (II) nevertheless enables a dynamic-fee based, in-field migration path for end-users to upgrade their "red ocean" (basic wireless) luminaire for usage within a "blue-ocean" fully connected system.

The following describes an upgrading process from "non-connected" standalone lighting control towards "connected" lighting control, e.g. with multiple zones and/or cloud connection. The process is described with reference to the flow-chart of FIG. 2.

Figure 2:
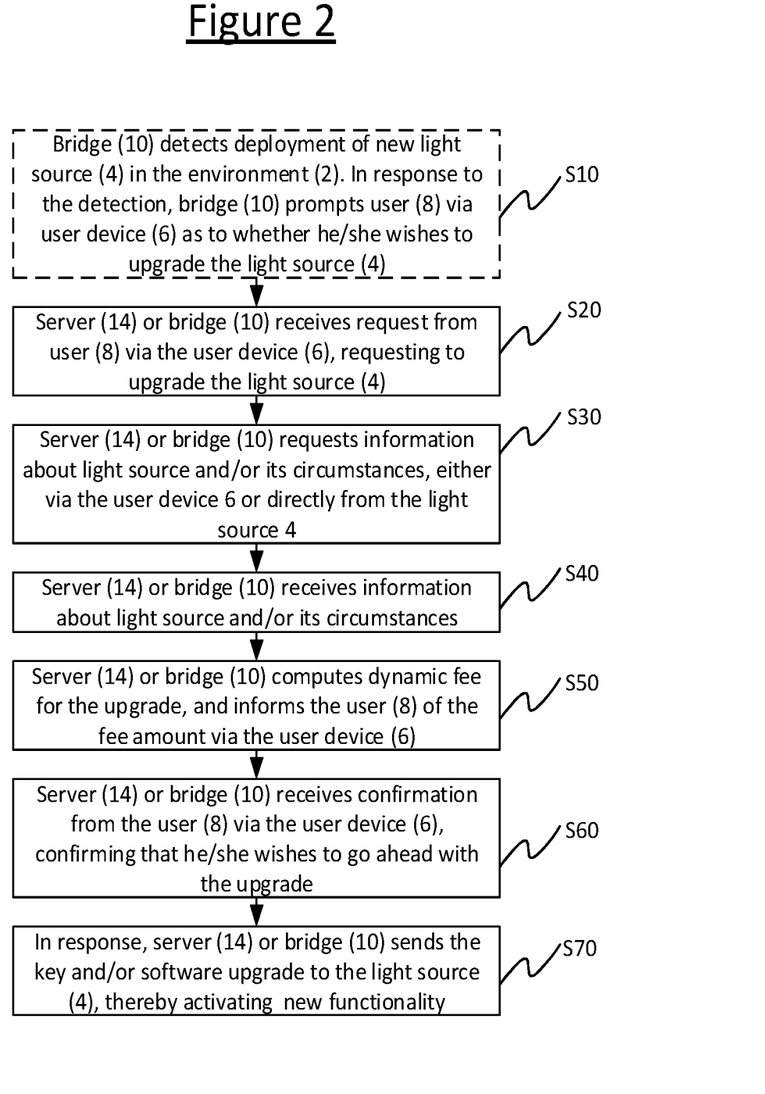
FIG. 2 is a flow chart illustrating a process of upgrading a light source.

The starting situation is that the basic "red ocean" wireless LED luminaire 4 just works with the local wireless wall switches and occupancy sensors 5; the "red ocean" LED luminaires 4 and the bridge 10 are hence not interoperable.

At step S10, the bridge 10 identifies that a "non-connected" red-ocean wireless LED luminaire 4 is present and suggests the end-user 8 a fee-based upgrade. Alternatively, the end-user 8 directly provides the bridge 10 with the serial number of the red-ocean luminaire he or she is considering upgrading.

At step S20, the end-user 8 confirms via the bridge 10 a desire to include the red-ocean basic-wireless LED luminaires 4 within a "blue-ocean" connected system. Alternatively this request could be initiated autonomously by the user 8, rather than being prompted by the bridge 10 (i.e. step S10 is optional).

At step S30, the "red-ocean" LED luminaire 4 receives a request from the bridge 10 to access application related data from the LED luminaire's application framework.

This data might be for example any one or more of:
a. configuration information of the presently basic-wireless application infrastructure the "red ocean" LED lamp is currently in;
b. configuration parameters of the "connect-ready" wireless system;
c. characteristics of the wireless luminaire 4 (e.g. lumen, production date, and/or colour temperature, etc.);
d. permission status of the luminaire regarding its interoperability with lighting bridges 10;
e. past usage information of the "connect-ready" system (e.g. past or present power consumption, and/or statistics of switching events); and/or
f. predicted future usage of the luminaire 4.

At step S40, the basic-wireless luminaire 4 transmits a response to the request from the bridge 10 based at least in part on the requested data from the luminaire's application framework (e.g. unique identifier of the LED luminaire, size of the network, and/or lamp past-usage information, etc.). Alternatively any of the above information could be submitted up-front as part of the request at Step S20 (i.e. the separate request from the bridge at step S30 is optional).

At step S50, the bridge 10 or portal 12 calculates a dynamic fee or a recurring revenue for the upgrade from standalone wireless control to connected control. The fee or recurring revenue is related to the application-specific luminaire data received by the bridge 10.

At step S60, the fee is charged to the end user 8 for upgrading the basic wireless luminaire 4 towards a fully connected luminaire. Upon payment by the consumer 8, the bridge 10 sends a proof of payment or other authentication or access-control-credentials to the LED luminaire 4. The basic LED luminaire 4 validates the proof of payment or other authentication or access control credentials it receives via the bridge 10.

At step S70, the LED luminaire 4 changes its status to allow inclusion of the basic LED luminaire in the network controlled by the bridge. The LED luminaire 4 exchanges its proprietary "red ocean" network key for the official Zigbee LightLink key used in the "blue-ocean" ecosystem. The bridge 10 removes the basic LED luminaire 4 from the autonomously stand-alone controlled wireless network. The bridge 10 includes the LED luminaire 4 into the bridge network. The now-connected LED luminaire 4 hence from now on is controlled by the bridge 10.

The fee might be based on the potential revenues associated with the usage data (application-specific data) received by the bridge from the luminaire 4. The calculation may for example include the expected energy savings (e.g. peak load shaving rebates from utilities) if the one or more LED luminaires 4 are transitioned from insular (basic) controls to being connected to the bridge 10 and/or cloud 12.

The upgrade fee may be based on the desired future usage characteristics for the bridge 10 and/or the LED luminaire (e.g. whether the luminaire 4 is to be used with a bridge controller 10 which is capable of dynamic lighting effect, or with a white dimming-only bridge for static scene setting; in which case there may be an extra charge for a corresponding firmware upgrade over the air).

The future usage characteristics can also include: how often the bridge 10 typically will be accessing data from the LED lamp or intelligent LED luminaire 4 (e.g. creation of highly granular data from luminaire-based occupancy sensing); the amount of data; the geographic location of the LED luminaire 4 and/or bridge 10 (e.g. different upgrade prices for emerging countries and US); the composition of the lighting control network (e.g. number of luminaires 4 and/or switches); and/or how long the LED lamp has been running or how close the LED lamp is to the end of its life. For instance, the spent or expected remaining lifespan may be measured in units of burning hours, or total age since new in months or years. E.g. the spent lifespan may be detected as the number of burning hours to-date; or the remaining lifespan may be determined by advanced end-of-life prediction taking into account factors such as light source dimming levels and ambient temperature, e.g. to predict when there are only 10 k hours left.

It may be desirable to offer very attractively priced "blue-ocean" upgrade for lamps or luminaires 4 towards the end of their life, as having knowledge about the specific installation location of almost-failing luminaires 4 are of high economic value for the luminaire manufacturer; this may include a model to offer the customer LED lamp or luminaire replacement deals via the bridge 10 and/or an app running on the user device 6 (or other user device).

In addition to unlocking "red ocean" luminaires for use with a bridge 10, a similar fee-based unlocking mechanism can be used to selectively allow firmware-upgrade-over-the-air or any updates of configuration data against (for instance, the luminaire OEM wants to upgrade the "personality" of luminaire with the latest sensing recipe).

In embodiments, certain components within the ecosystem, such as wireless wall switches may be automatically upgraded—without a fee payment—towards connected, while other components such as LED luminaires may require a fee The disclosure can also be extended also to Wi-Fi or Bluetooth use cases where just a smartphone and the LED luminaire are involved without the presence of a bridge.

One possible embodiment of fee-based upgrade approach is described in the following in relation to a Zigbee Light Link implementation. In this example, the provider will embed within each "red ocean" Connect-Ready luminaire 4 both a proprietary Connect-ready key and a LightLink key. The Zigbee alliance does not charge any fees for Light Link keys; this will enable models where only a small fraction of Connect-Ready luminaires 4 will actually be upgraded towards the connected modality. Connect-Ready and Zigbee Light Link are designed as a two different parallel universes; however, Connect-Ready will follow a rather similar security & key approach and the same command set as Zigbee Light Link; but unlike ZLL, the global key for ZLL-ready is only made known or available to some particular luminaires 4 and wall-switches and not others, e.g. only this from a particular provider or providers.

An example process for the after-sales upgrade from a proprietary "ZLL-Ready" Connect-Ready luminaire to an "ZLL open-standard" connected luminaire may then be as follows. First, the bridge 10 searches for proprietary ZLL-Ready Connect-Ready lamps. In ZLO (the upcoming merge of ZLL, Zigbee Green Power and Zigbee HomeAutomation) every luminaire 4 has an individual unique identifier code.

The bridge 10 can query the Connect-ready luminaire for this unique code; this is possible without the connect-ready ZLL-ready luminaire 4 yet being commissioned within the bridge's network. The bridge 10 then sends this unique luminaire identifier code to the portal 14 to check if this specific Connect-Ready luminaire 4 has been upgraded by the end-user 8 to a Connected LED luminaire. If the upgrade payment has been confirmed by the portal 14, the bridge 10 initiates the upgrade process: the bridge 10 will send to the Connect-Ready lamp a double-secured universal unlocking key, which can decrypt the real ZLL or ZLO key already hidden within the Connect-Ready LED lamp.

The double secured key contains both the unique identifier of the specific LED luminaire 4 which needs to be unlocked and the universal unlocking key for upgrading towards ZLL. This prevents replay attacks. The string is then encrypted with another key, which is known by both the portal 14 and the ZLL-ready luminaire 4. The LED luminaire 4 uses a key to decrypt the message sent by the bridge 10 or portal 14. The luminaire 4 then compares whether the unique identifier received in this message coincides with its unique identifier. If yes, it uses the unlocking key sent by the bridge to unhide the ZLL key in the LED luminaire 4. The upgraded Connect-Ready LED luminaire 4 then leaves the "red-ocean" standalone network and joins the bridge as a full-feature Connected luminaire (e.g. including over-the-air firmware upgrade capability). The luminaire 4 may reboot to start with the new ZLL networking stack and the new configuration parameters.

Note that the upgrade process described above uses the same mechanisms as common in Zigbee, and hence it is no more and no less secure as Zigbee.

In embodiments, there may be applied an app-based upgrade process, which gets initiated as soon as the bridge 10 discovers a new Connect-Ready luminaire 4. In this case, a notification message is pushed to an application (app) running on the end-user's smartphone, offering him or her a fee-based upgrade towards a Connected luminaire. The app-based payment follows the well-known security strategies used by online retailers.

In embodiments, the status of the LED luminaires 4 (fee already paid or fee unpaid) may be registered in a central database of LED lamps and switches, accessible to the portal server 14.

Whenever a bridge 10 detects a connect-ready lamp which the bridge 10 is not yet authorized to control, the bridge 10 transmits a request for registration information to the cloud 12, 14. If the LED luminaire 4 is determined to be authorized, the cloud 12, 14 transmits a response to the request from the bridge 10, which is based upon the identifier of the luminaire 4 and may include a security code which the bridge 10 can use to unlock the LED luminaire for use with bridges 10. Certain bridges 10 may be enabled to unlock all Connect-ready LED luminaires 4 without any payments or checking of the registration information in the cloud.

It will be appreciated that the above embodiments have been described only by way of example.

For instance, the above process can be applied in relation to other types of first and second access technologies, not just a proprietary "Connect-Ready" technology as the first, and/or not just a ZigBee Light Link as the second technology. In general, where a light source 4 is controllable via any first communication channel, the upgrade can be to enable additional control functionality via any second communication channel different from the first channel; where the second communication channel may use a different communication technology than the first (e.g. upgrade to ZigBee), or may use the same communication technology (e.g. both ZigBee) but with the second channel being via a different path than the first channel (e.g. upgrade to control via a lighting bridge 10).

For example, a light source that is initially only controllable via a first channel in the form of a wired means such as power-line communications (e.g. power over Ethernet), and then the light source 4 may be upgraded to being controllable via a second communication channel in the form of a wireless means such as ZigBee, Wi-Fi etc. Or as another example, the first communication channel may comprise only a point-to-point communication mode that just exists for configuring the light source 4 (e.g. light output trimming via Bluetooth, parameter setting of standalone daylight sensor or occupancy sensor control). In this case, the second channel to which the light source 4 is upgraded may just be a local wireless network for as little as two or more light sources 4, e.g. to upgrade to control via a single local demand response controller for the building in which the light source 4 is deployed. In another example, the second channel may be a cellular connection via a mobile cellular network such as a 3GPP network (e.g. this example may especially relevant for streetlighting applications).

As another example, the light source 4 may be upgraded from a distributed intelligence (whereby each light source has a respective sensor and the light sources 4 control themselves based on sensor signals shared between the light sources 4), to a centralized intelligence (whereby at least some of the decision-making involved in controlling the luminaires 4 is performed by a centralized lighting bridge 10). As yet another example, the light source may be upgraded from a stand-alone intelligence (whereby each light source acts autonomously based on its own respective sensor) to a distributed intelligence.

Further, other forms of security key will in themselves be known to a person skilled in the art, and so could be used for the unlocking of the second control technology. Moreover, the disclosed techniques are not limited to the case where the capability to be controlled via the second communication channel is already pre-equipped on-board the light source 4 at the time of deployment and is activated by being unlocked by a security key. Alternatively, the capability to be controlled via the second channel may be deactivated by omitting the firmware (embedded software) or at least part of the firmware required on the light source 4 to implement the communication via the second channel (e.g. the software needed to communicate via the bridge 10 or Internet 12). In this case, the capability is activated by sending a firmware download to the light source 4, i.e. a software upgrade providing the relevant code for implementing the communication via the second channel. The firmware upgrade of the luminaire may be performed via the bridge or via a commissioning device such as a smartphone/tablet. This option could be used as an alternative to, or in addition to, requiring the light source 4 to obtain a key to unlock the capability.

Further, note that once the second communication channel is activated, the first communication channel may be may be deactivated but it need not necessarily be. Alternatively the first channel may remain fully active or partially active even after the second channel has been activated. For instance, there are more and more radios in the lighting domain which can concurrently serve multiple protocols. While the luminaire 4 may be switching to the second communication channel to communicate, e.g. with a bridge 10, the luminaire 4 may still keep communicating via the first communication channel to a wall-switch end-node, which did not get updated to the second communication channel. E.g. some wall-switch use mechanical energy harvesting (such as the Tap wall-switch product from Philips Hue using Zigbee Green Power), and such switches may not necessarily be susceptible to being upgraded.

In yet further embodiments, other lighting systems comprising other arrangements of one or more light sources 4, one or more control devices 6 and/or one or more sensors 5 may also benefit from similar techniques as those disclosed herein. For instance, the disclosed techniques are not only applicable to LED based luminaires, and any of the features above may apply equally to other types such those comprising gas discharge lamps, filament bulbs, organic LEDs (OLEDs), or laser lighting. Further, the scope of the present disclosure is not limited in terms of the purpose of luminaire. In embodiments the luminaire 4 being upgraded is one which is designed to emit illumination suitable for illuminating an environment 2, i.e. functional lighting. Nonetheless, instead of providing functional lighting (or as well as providing functional lighting), it is also possible that the luminaire 4 is a device designed to generate a lighting effect, such as task lighting, accent lighting or mood lighting; e.g. an embedded luminaire embedded in a surface which changes colour. Moreover, any of the features disclosed above in relation to a luminaire may equally apply to controlling an upgrading an individual lamp in the case where the communication technology is embedded in the lamp itself rather than just in the housing of the luminaire.

Further, the (monetary) payment computed for the upgrade could instead be replaced (or supplemented) by one or more other kinds of transaction. Other kinds of transactions could for example include the customer making business commitments to order additional products from a supplier of the light source in the future, or to subscribe to service contracts, advanced financing schemes Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method comprising:
providing a light source in the form of a luminaire or a lamp operable to emit light into an environment, the light source being activated and being operable to emit said light at a time at which the light source is deployed into said environment to enable said light to be controlled via a first communication channel, but having a capability for said light to be controlled via a second communication channel being electronically deactivated at said time due to inaccessibility by the light source to first data;
after said time of deployment of the light source into said environment, receiving a request to upgrade the light source; and
in response to said request to upgrade the light source, sending activation data to the light source or to a user of the light source and rendering said first data accessible to the light source, thereby enabling said capability for said light to be controlled via the second communication channel to be electronically activated,
wherein said activation data comprises an electronic security key, enabling said capability for said light to be unlocked on the light source, and
wherein a security key is also required for unlocking the first communication channel to enable said light to be controlled via the first communication channel, but the security key for unlocking the first communication channel is provided to the light source or the user of the light source prior to said deployment of the light source into said environment or at said time of deployment of the light source into said environment.

2. The method of claim 1, wherein the first communication channel is via a local area network or a direct point-to-point connection with the light source.

3. The method of claim 2, wherein the first communication channel is via ZigBee, Bluetooth, 6LoWPAN, Wi-Fi, power-line communication, Ethernet cable, DMX network, or DALI network.

4. The method of claim 1, wherein the second communication channel is via a wide area network or via a bridge that connects to a wide area network.

5. The method of claim 4, wherein said wide area network comprises the Internet, a cellular network, or a dedicated wide-area lighting or utility control network.

6. The method of claim 1, further comprising receiving information relating to the light source, and computing a payment or other transaction as a function of said information; wherein the sending of said activation data is conditional on receipt of said payment or other transaction.

7. The method of claim 6, wherein said information comprises one or more of:
a spent or remaining lifetime of the light source,
a predicted power saving to be achieved by the upgrade of the light source,
a predicted amount of time or number of times the second communication channel will be used to control illumination,
a type of a lighting bridge,
a geographic location of said deployment of the light source into said environment, and/or
a number of other networkable luminaires and/or utilities in said environment which could be incorporated into a same network as the light source if said capability for said light is activated.

8. The method of claim 1, wherein the light source is equipped with said capability to control said light via the second communication channel from said time of deployment of the light source into said environment, but with said capability being electronically deactivated by being electronically locked at said time of deployment of the light source into said environment.

9. The method of claim 1, wherein said security key is at least in part based on a unique ID of the luminaire.

10. The method of claim 1, wherein said capability for said light is electronically deactivated by at least part of software required to implement said capability for said light being omitted from the light source at said time of deployment of the light source into said environment, and wherein said activation data comprises a software upgrade to provide the omitted at least part of software required to implement said capability for said light.

11. The method of claim 1, wherein said request to upgrade the light source is received from a user, and the method further comprises:
   detecting the deployment of the light source into said environment, when having the second communication channel locked; and
   in response to said detection, prompting a user with an option to upgrade the light source, thereby invoking said request to upgrade the light source.

12. A method comprising:
   providing a light source in the form of a luminaire or a lamp operable to emit light into an environment, the light source being activated from a time at which the light source is deployed into said environment to enable the light to be controlled via a first communication channel, but having a capability for the light to be controlled via a second communication channel being electronically deactivated at said time;
   after said time of deployment of the light source into said environment, receiving a request to upgrade the light source; and
   in response to said request to upgrade the light source, sending activation data to the light source or to a user of the light source, thereby enabling said capability for the light to be controlled via the second communication channel to be electronically activated,
   wherein the light source is equipped with said capability to control the light via the second communication channel from said time of deployment of the light source into said environment, but with said capability being electronically deactivated by being electronically locked at said time of deployment of the light source into said environment,
   wherein said activation data comprises an electronic security key, enabling said capability to be unlocked on the light source, and
   wherein a security key is also required for unlocking the first communication channel to enable the light to be controlled via the first communication channel, but the security key for unlocking the first communication channel is provided to the light source or the user of the light source prior to said deployment of the light source into said environment or at said time of deployment of the light source into said environment.

13. A system comprising:
   a light source in the form of a luminaire or a lamp deployed into an environment, arranged to emit light into the environment at a time, wherein the light source is configured to enable the light to be controlled via a first communication channel, but having a capability for the light to be controlled via a second communication channel being electronically deactivated at said time due to inaccessibility by the light source to first data; and
   a server arranged to receive a request to upgrade the light source, and in response to said request to upgrade the light source, to send activation data to the light source or a user of the light source and to render said first data accessible to the light source, thereby enabling said capability for the light to be controlled via the second communication channel to be electronically activated,
   wherein said activation data comprises an electronic security key, enabling said capability for the light to be unlocked on the light source, and
   wherein a security key is also required for unlocking the first communication channel to enable the light to be controlled via the first communication channel, but the security key for unlocking the first communication channel is provided to the light source or the user of the light source prior to said deployment of the light source into said environment or at said time of deployment of the light source into said environment.

14. The system of claim 13, further comprising a lighting bridge arranged to automatically detect said deployment of the light source into said environment when having the second communication channel deactivated, and in response to said detection, to automatically prompt a user with an option to upgrade the light source, thereby invoking said request to upgrade the light source.

15. A computer program product for controlling a light source in the form of a luminaire or a lamp to emit light into an environment, the computer program product being embodied on a non-transitory computer-readable storage medium and configured so as when run on the light source to:
   at a time at which the light source is operable to emit the light and is first deployed into said environment, enabling the light to be controlled via a first communication channel, wherein said light source has a capability for the light to be controlled via a second communication channel being electronically deactivated at said time due to inaccessibility by the light source to first data;
   receive activation data after said time of deployment of the light source into said environment such that said first data is rendered accessible to the light source; and
   use said first data to enable the light to be controlled via a second communication channel,
   wherein said activation data comprises an electronic security key, enabling said capability for said light to be unlocked on the light source, and
   wherein a security key is also required for unlocking the first communication channel to enable said light to be controlled via the first communication channel, but the security key for unlocking the first communication channel is provided to the light source prior to said deployment of the light source into said environment or at said time of deployment of the light source into said environment.

* * * * *